United States Patent
Muto

(10) Patent No.: US 7,440,749 B2
(45) Date of Patent: Oct. 21, 2008

(54) DISPLAYING ADVERTISEMENT ON REAR DISPLAY AND CALCULATING COMMUNICATION COSTS TO BILL USERS AND ADVERTISERS

(75) Inventor: Takashi Muto, Tokyo (JP)

(73) Assignee: NEC Corporation, Tokyo (JP)

( * ) Notice: Subject to any disclaimer, the term of this patent is extended or adjusted under 35 U.S.C. 154(b) by 127 days.

(21) Appl. No.: 10/918,640

(22) Filed: Aug. 16, 2004

(65) Prior Publication Data

US 2005/0049008 A1     Mar. 3, 2005

(30) Foreign Application Priority Data

Aug. 27, 2003    (JP)    ............... 2003-302640

(51) Int. Cl.
    *H04M 3/42*    (2006.01)
(52) U.S. Cl. .............. 455/414.1; 455/566; 455/406; 455/466; 709/203; 709/206; 705/15
(58) Field of Classification Search ............ 455/466, 455/414.1, 414.2, 566, 575.3, 406; 709/206, 709/203; 705/14
    See application file for complete search history.

(56) References Cited

U.S. PATENT DOCUMENTS

| 6,014,502 | A * | 1/2000 | Moraes ............... 709/219 |
| 6,876,974 | B1 * | 4/2005 | Marsh et al. ............ 705/14 |
| 6,968,178 | B2 * | 11/2005 | Pradhan et al. ........... 455/406 |
| 2002/0039914 | A1 | 4/2002 | Hama et al. |
| 2002/0142810 | A1 | 10/2002 | Kawasaki et al. |
| 2002/0154163 | A1 | 10/2002 | Melchner |
| 2003/0066059 | A1 | 4/2003 | Moon et al. |
| 2003/0096625 | A1 * | 5/2003 | Lee et al. ............ 455/466 |
| 2004/0259599 | A1 * | 12/2004 | Okawa ............... 455/567 |

FOREIGN PATENT DOCUMENTS

| DE | 101 11 970 A1 | 9/2002 |
| EP | 1 477 918 A1 | 11/2004 |
| GB | 2372176 | * 8/2002 |
| GB | 2 378 848 A | 2/2003 |
| JP | 11-298959 | 10/1993 |
| JP | 2002-051159 A | 2/2002 |
| JP | 2002-165028 A | 6/2002 |
| JP | 2002-182828 A | 6/2002 |
| JP | 2002-247206 A | 8/2002 |
| JP | 2003-087420 A | 3/2003 |
| JP | 2003-216863 A | 7/2003 |
| WO | WO 00/77979 A2 | 12/2000 |
| WO | WO01/71949 A1 | 9/2001 |
| WO | WO0171949 | * 9/2001 |
| WO | WO 03/024136 A1 | 3/2003 |
| WO | WO 03/067465 A1 | 8/2003 |
| WO | WO 03/081446 A1 | 10/2003 |

* cited by examiner

*Primary Examiner*—Vincent P. Harper
*Assistant Examiner*—Dung Lam
(74) *Attorney, Agent, or Firm*—Foley & Lardner LLP

(57) ABSTRACT

A mobile terminal acquires an advertising display program with advertising information from an advertising agency server by issuing an advertising display program acquisition request and displays the advertising information on its rear display by executing the acquired advertising display program. The mobile terminal executes the advertising display program at the time of voice conversation or mail creation.

23 Claims, 11 Drawing Sheets

| USER ID | TELEPHONE NUMBER | TERMINAL INFOMATION | | BILLING INFORMATION | | | USAGE TIME | ... |
|---|---|---|---|---|---|---|---|---|
| | | REAR DISPLAY | MODEL NAME | COST | ADVERTISING COST | SERVER NAME | | |
| | | | | | | | | |

FIG. 4

| PROGRAM NAME | rev | PROGRAM | DATA |
|---|---|---|---|
| | | | |

FIG. 5

| USER ID | USER INFORMATION | | PROGRAM NAME | rev | DOWNLOAD TIME | USAGE TIME | BILLING INFORMATION | |
| --- | --- | --- | --- | --- | --- | --- | --- | --- |
| | E-MAIL ADDRESS | ... | | | | | USED PACKET NUMBER | COST |
| | | | | | | | | |
| | | | | | | | | |
| | | | | | | | | |

FIG. 6

DISPLAYING ADVERTISEMENT ON REAR DISPLAY AND CALCULATING COMMUNICATION COSTS TO BILL USERS AND ADVERTISERS

BACKGROUND OF THE INVENTION

1. Field of the Invention

The present invention relates to a mobile terminal, an electronic advertising system and display method using the mobile terminal, an advertising display program, and an advertising display support program. In particular, the present invention relates to a mobile terminal, an electronic advertising system and display method using the mobile terminal, an advertising display program, and an advertising display support program, with which advertising information is displayed on a rear display of the mobile terminal.

2. Description of the Related Art

As a conventional electronic advertising system that uses a mobile terminal, for instance, JP 2002-165028 A (hereinafter referred to as "Patent Document 1") discloses a model in which a toll free service or the like is provided based on displaying of advertising on a display unit on a front side of a mobile phone terminal.

In recent years, camera-equipped terminals have come into widespread use. Those terminals are equipped with large rear LCDs in ordinary cases, although there is a circumstance that the rear LCDs are not specifically used at the time of voice conversation and mail creation. For instance, in the model as disclosed in Patent Document 1, the advertising is displayed on the front display of the mobile phone. In this case, there occurs a problem in that the advertising is limitedly provided to the user of the mobile phone on account of being targeted to the user of the mobile phones and the effect of the advertising is low.

Also, in the model as disclosed in Patent Document 1, the advertising is displayed in a part of an ordinary display area, so that there occurs a problem in that the amount of information that can be displayed on a display is reduced and the usability of the user is impaired.

SUMMARY OF THE INVENTION

The present invention has been made in order to solve the problems described above and has an object to provide advertising information without limiting display information that a user of a mobile phone terminal requires and also to provide the advertising information to an indefinite number of persons who are around the mobile phone terminal and persons who do not use the mobile phone terminal.

A mobile terminal according to the present invention acquires advertising information from a server and displays the acquired advertising information. The mobile terminal includes a rear display and a control circuit. The control circuit includes: acquisition means for acquiring an advertising display program with the advertising information from the server; execution means for executing the advertising display program acquired by the acquisition means; and display control means for displaying the advertising information on the rear display through the execution of the acquired advertising display program by the execution means.

Further, an electronic advertising system using a mobile terminal according to the present invention includes: the mobile terminal having a rear display; an advertising agency server; and a connection server that performs relay between the mobile terminal on a wireless communication network side and the advertising agency server on an Internet side. The advertising agency server includes: first storage means for storing an advertising display program with advertising information; and downloading means for downloading the advertising display program with the advertising information in response to an advertising display program acquisition request from the mobile terminal. The mobile terminal includes: second storage means for storing the advertising display program with the advertising information acquired from the advertising agency server in response to the advertising display program acquisition request; execution means for executing the advertising display program stored by the second storage means; and display control means for displaying the advertising information on the rear display through the execution of the stored advertising display program by the execution means.

Further, in the mobile terminal or electronic advertising system, at the time of at least one of voice conversation and mail creation, the execution means of the mobile terminal executes the advertising display program.

Further, in the mobile terminal or electronic advertising system, the mobile terminal has a foldable enclosure, and when the mobile terminal is in an opened state, the execution means of the mobile terminal executes the advertising display program.

Further, in the electronic advertising system, the connection server includes: calculation means for calculating a cost from a number of packets exchanged between the mobile terminal and the advertising agency server while a communication path is established therebetween; and billing means for issuing a bill for the calculated cost to the advertising agency server.

Further, in the electronic advertising system, the advertising agency server includes third storage means for storing, when the advertising display program is downloaded to the mobile terminal, usage history information concerning a user of the mobile terminal, the usage history information including information on a download time of the advertising display program. When the advertising display program acquisition request is received from the mobile terminal, if a prescribed time period has passed from the download time shown by the usage history information stored by the third storage means, the downloading means of the advertising agency server downloads the advertising display program with the advertising information.

Further, in the electronic advertising system, the advertising agency server includes third storage means for storing, when the advertising display program is downloaded to the mobile terminal, usage history information concerning a user of the mobile terminal, the usage history information including information on a revision of the advertising display program. When the advertising display program acquisition request is received from the mobile terminal, if the revision of the advertising display program shown by the usage history information stored in the third storage means is not yet changed to the latest revision, the downloading means of the advertising agency server downloads the advertising display program with the advertising information.

Further, in the mobile terminal or electronic advertising system, the advertising information is information including at least one of one or more still images, a moving image, and letter information.

An electronic advertising display method according to a first item of the present invention is an electronic advertising display method using a mobile terminal with which the mobile terminal equipped with a rear display acquires advertising information from a server that is a connection destination and displays the acquired advertising information. The electronic advertising display method includes: causing the mobile terminal to acquire an advertising display program with the advertising information from the server by issuing an advertising display program acquisition request; causing the mobile terminal to execute the acquired advertising display program; and causing the mobile terminal to display the advertising information on the rear display through the execution of the acquired advertising display program.

Further, an electronic advertising display method according to a second item of the present invention is an electronic advertising display method using a mobile terminal having a rear display, an advertising agency server, and a connection server that performs relay between the mobile terminal on a wireless communication network side and the advertising agency server on an Internet side. The electronic advertising display method according to the second item of the invention includes: causing, when an advertising display program acquisition request is received from the mobile terminal, the advertising agency server including a first database for storing an advertising display program with advertising information, to read the advertising display program with the advertising information from the first database and to download the read program to the mobile terminal; causing the mobile terminal to store, into a memory unit, the advertising display program with the advertising information acquired from the advertising agency server by issuing the advertising display program acquisition request; causing the mobile terminal to execute the advertising display program stored in the memory unit; and causing the mobile terminal to display the advertising information on the rear display through the execution of the advertising display program.

Further, in the electronic advertising display method according to the first or second item of the present invention, the mobile terminal is caused to execute the advertising display program at the time of at least one of voice conversation and mail creation.

Further, in the electronic advertising display method according the first or the second item of the present invention, the mobile terminal has a foldable enclosure, and when the mobile terminal is in an opened state, the mobile terminal is caused to execute the advertising display program.

Further, the electronic advertising display method according to the second item of the present invention further includes causing the connection server to calculate a cost from a number of packets exchanged between the mobile terminal and the advertising agency server while a communication path is established therebetween, and to issue a bill for the calculated cost to the advertising agency server.

Further, the electronic advertising display method according to the second item of the present invention further includes: causing, when the advertising display program is downloaded to the mobile terminal, the advertising agency server to store, in a second database, usage history information concerning a user of the mobile terminal, the usage history information including information on a download time of the advertising display program; and causing, when the advertising display program acquisition request is received from the mobile terminal for downloading the advertising display program with the advertising information, if a prescribed time period has passed from the download time shown by the usage history information stored by the second database, the advertising agency server to download the advertising display program with the advertising information.

Further, the electronic advertising display method according to the second item of the present invention further includes: causing, when the advertising display program is downloaded to the mobile terminal, the advertising agency server to store, in a second database, usage history information concerning a user of the mobile terminal, the usage history information including information on a revision of the advertising display program; and causing, when the advertising display program acquisition request is received from the mobile terminal for downloading the advertising display program with the advertising information, if the revision of the advertising display program shown by the usage history information stored in the second database is not yet changed to the latest revision, the advertising agency server to download the advertising display program with the advertising information.

Further, in the electronic advertising display method according to the first or second item of the present invention, the advertising information is information including at least one of one or more still images, a moving image, and letter information.

Further, an advertising display program according to the present invention is an advertising display program for causing a computer to execute a processing including displaying advertising information on a rear display.

Further, in the advertising display program, the advertising information is information including at least one of one or more still images, a moving image, and letter information.

Further, an advertising display support program according to a first item of the present invention is an advertising display support program for causing a computer to execute a processing including: acquiring an advertising display program with advertising information from an advertising agency server by issuing an advertising display program acquisition request; executing the acquired advertising display program at the time of at least one of voice conversation and mail creation; and displaying the advertising information on a rear display through the execution of the acquired advertising display program.

Further, an advertising display support program according to a second item of the present invention is an advertising display support program for causing a computer to execute a processing including: acquiring advertising display program with advertising information from an advertising agency server by issuing an advertising display program acquisition request; executing the acquired advertising display program when a foldable enclosure of the computer is in an opened state; and displaying the advertising information on a rear display through the execution of the acquired advertising display program.

Further, in the advertising display support program according to the first item of the present invention, the computer is caused to execute the acquired advertising display program when a foldable enclosure of the computer is in an opened state.

Further, in the above advertising display program according to the first or second item of the present invention, the advertising information is information including at least one of one or more still images, a moving image, and letter information.

BRIEF DESCRIPTION OF THE DRAWINGS

These and other aspects, features and advantages of the invention will become more fully apparent from the following detailed description taken in conjunction with accompanying drawings. In the drawings:

FIG. 1A is the schematic construction diagram showing a front view of the mobile phone terminal under an opened state;

FIG. 1B is the schematic construction diagram showing a side view of the mobile phone terminal under an opened state;

FIG. 1C is the schematic construction diagram showing a rear view of the mobile phone terminal under an opened state;

FIG. 4 is a schematic construction diagram showing an example of a construction of a user information database shown in FIG. 2;

FIG. 5 is a schematic construction diagram showing an example of a construction of an advertising information database shown in FIG. 2;

FIG. 6 is a schematic construction diagram showing an example of a construction of a user management database shown in FIG. 2;

DETAILED DESCRIPTION OF THE PREFERRED EMBODIMENT

First, prior to description of an embodiment of the present invention, the fundamentals of the present invention will be described briefly.

A user of a mobile terminal, such as a mobile phone terminal or a PHS (Personal Handyphone System) handset, accesses an advertising agency server possessed by an advertising agency and downloads an advertising display program by himself/herself. The advertising agency in this case is an agency that provides a service where advertising information provided from respective advertisers including enterprises is forwarded to the mobile terminal user. The advertising display program downloaded to the mobile terminal is executed at the time of voice conversation or mail creation, and the mobile terminal displays advertising on its rear display through the execution of the advertising display program. Also, the advertising agency server stores user information registered by the user in a database. When a bill is received from a connection server of a wireless communication company that is a mobile phone carrier, the advertising agency server checks the legitimacy of the bill with reference to the database. Then, if it is found that the bill is legitimate, the advertising agency server executes a procedure for paying a certain amount of communication charge to the mobile phone carrier.

Next, an embodiment of the present invention will be described in detail with reference to the accompanying drawings.

Figure 2:
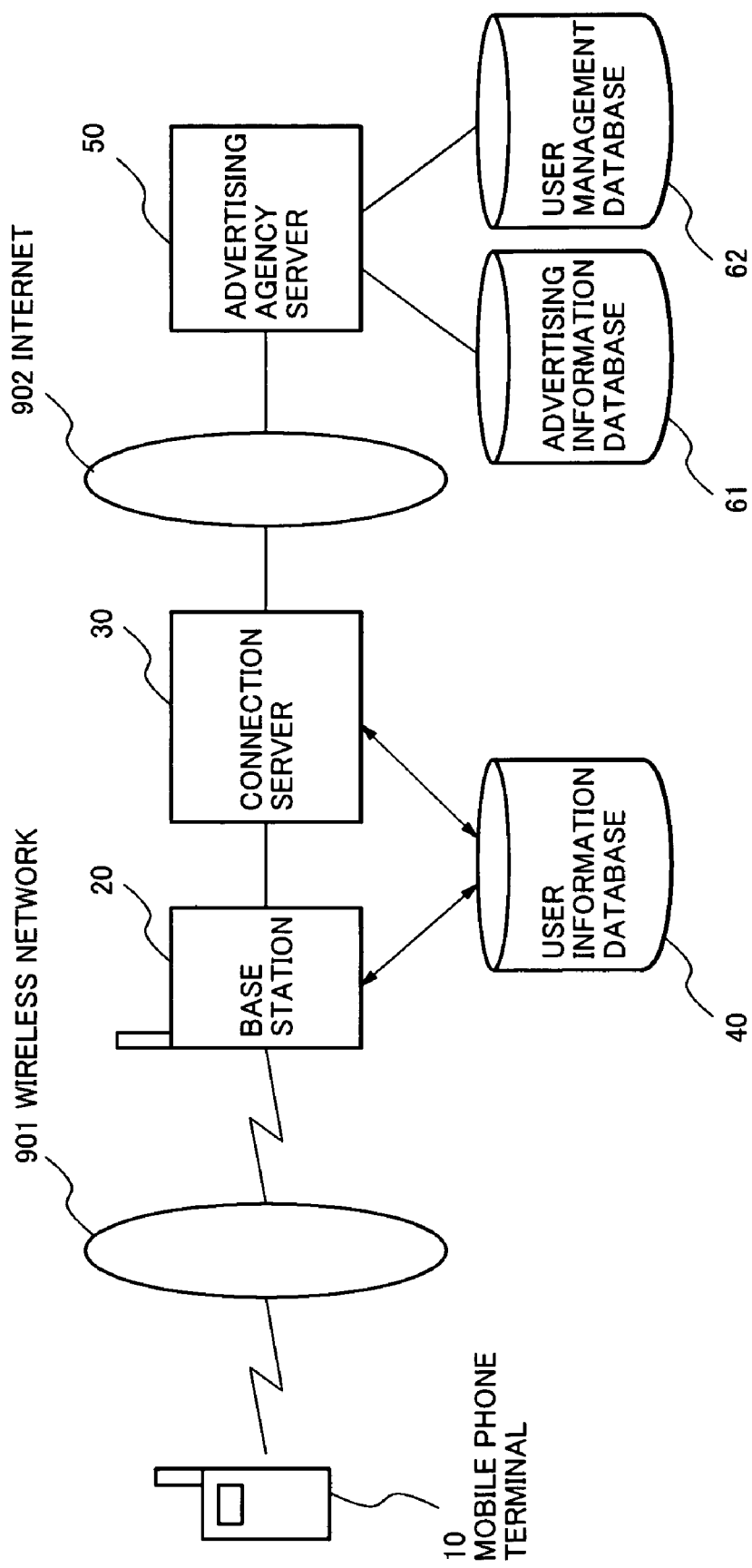
FIG. 2 is a block diagram showing a construction of a system according to an embodiment of the present invention.

FIG. 2 is a block diagram showing a construction of a system according to this embodiment of the present invention. As shown in this drawing, the present system includes a wireless network 901, the Internet 902, a mobile phone terminal 10, a base station 20, a connection server 30, a user information database 40, an advertising agency server 50, an advertising information database 61, and a user management database 62. Note that it is assumed that the mobile phone terminal 10 is equipped with a rear display in addition to a front display. Also, the base station 20 and the connection server 30 are connected to each other through a LAN and the user information database 40 is connected onto the LAN.

The base station 20 shown in FIG. 2 transmits/receives wireless data to/from the mobile phone terminal 10 through the wireless network 901.

The connection server 30 shown in FIG. 2 is information processing equipment such as a personal computer, a workstation, or a server that operates through program control by a not-shown processor (central processing unit). Also, the connection server 30 is connected to the base station 20 through a dedicated line, is capable of accessing the Internet 902, and is managed on a mobile phone carrier (wireless communication company) side. The connection server 30 establishes connection to the advertising agency server 50 in response to an Internet connection request from the mobile phone terminal 10.

The advertising agency server 50 shown in FIG. 2 is information processing equipment such as a personal computer, a workstation, or a server that operates through program control by a not-shown processor (CPU). On receiving an advertising display program acquisition request from the mobile phone terminal 10, the advertising agency server 50 reads a corresponding advertising display program with advertising information from the advertising information database 61 and downloads the read program to the mobile phone terminal 10.

The user information database 40 shown in FIG. 2 is stored in an area of a nonvolatile recording medium (magnetic disk, for instance) in a server that operates through program control by a not-shown processor (CPU), and is accessed by the base station 20 or the connection server 30. As shown in FIG. 4, the user information database 40 includes multiple areas such as a user ID area, a telephone number area, a terminal information area, a billing information area, and a usage time area. The user ID area stores the user ID of each user (contractor) and the telephone number area stores the telephone number of a mobile terminal used by the user. The terminal information area stores information concerning the terminal. In more detail, the terminal information area includes a rear display function sub-area showing whether the terminal is equipped with a rear display and a model name sub-area showing the model name of the terminal. The billing information area stores billing information concerning the user. In more detail, the billing information area includes a cost sub-area showing a cost of communication path connection, an advertising cost sub-area showing a cost, out of the cost of the communication path connection, that should be paid by the advertising agency (cost resulting from connection between the mobile terminal 10 and the advertising agency server 50), and a server name sub-area showing the name of a server used at that time. The usage time area stores information showing each usage time.

Figure 5:
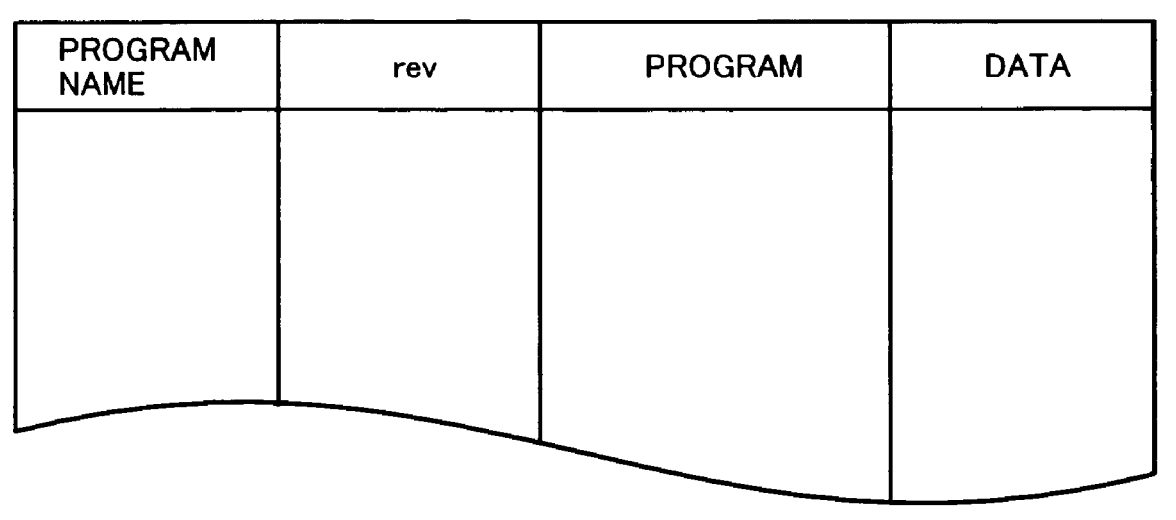

The advertising information database 61 shown in FIG. 2 is stored in an area of a not-shown nonvolatile recording medium (magnetic disk, for instance) and is accessed by the advertising agency server 50. As shown in FIG. 5, the advertising information database 61 includes a program name area, a revision area, a program area, and a data area. The program name area stores the program name of each advertising display program, the revision area stores the latest revision of the advertising display program, the program area stores the advertising display program, and the data area stores advertising information of the advertising display program.

The user management database 62 shown in FIG. 2 is stored in an area of a not-shown nonvolatile recording medium (magnetic disk, for instance) and is accessed by the advertising agency server 50. As shown in FIG. 6, in order to make it possible to perform management in units of user IDs based on user information registered by users, the user management database 62 includes a user ID area, a user information area, a program name area, a revision area, a download time area, a usage time area, and a billing information area. The user ID area stores the user ID of each user. The user information area stores the user information registered by the user. The program name area stores the program name of a program downloaded by the user. The revision area stores the revision of the downloaded program. The download time area stores a time (date and time) at which the program was downloaded. The usage time area stores a time slot (written using "from/to" on a date and time basis) in which a communication path was established in order to download the program. The billing information area stores information concerning a cost of connection with a mobile phone terminal of the user. The user information area described above includes sub-areas such as an e-mail address sub-area showing the e-mail address of the user. Also, the billing information area described above includes a used packet number sub-area showing each number of packets used and a cost sub-area showing a cost calculated from the number of packets used.

In the present system shown in FIG. 2, as to the mobile phone terminal 10, the base station 20, the connection server 30, and the customer database 40, it is possible to divert an already-existing system. In this case, construction elements that need to be newly added or changed in order to construct the present system are the advertising agency server 50, the advertising information database 61, and the user management database 62.

Figure 3:
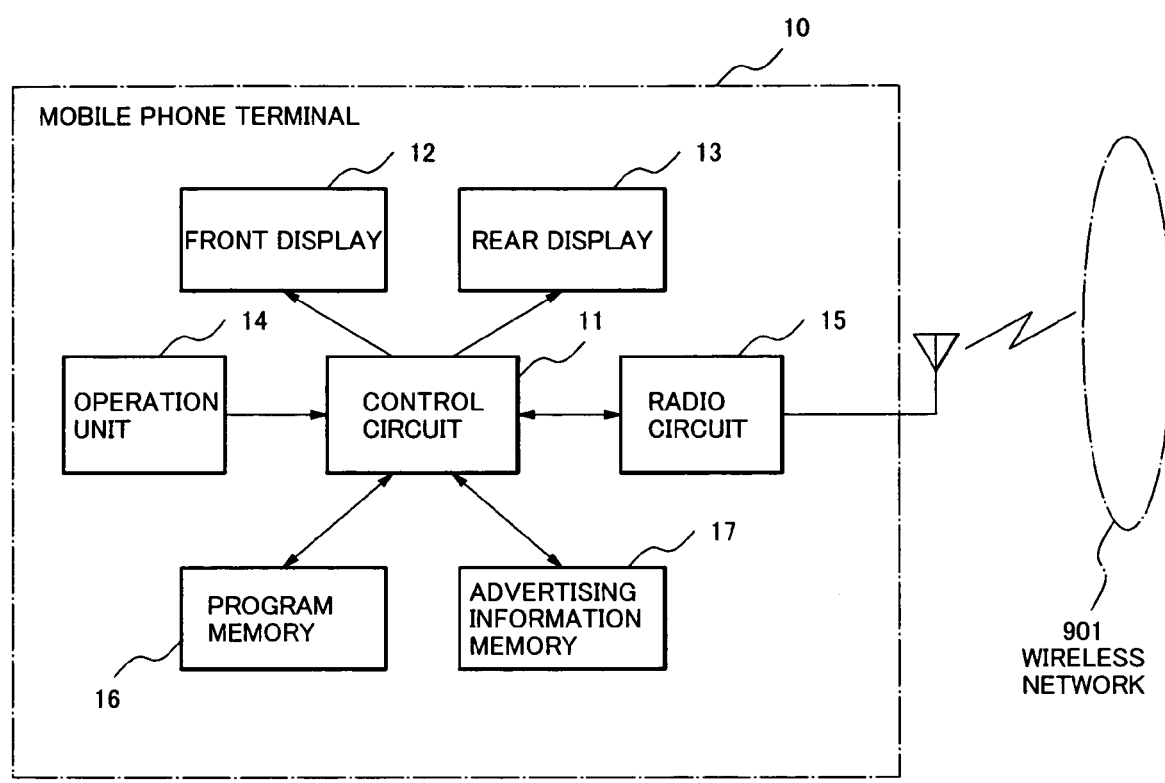
FIG. 3 is a block diagram showing an example of an internal construction of the mobile phone terminal shown in FIG. 2.

The mobile phone terminal 10 shown in FIG. 2 operates in accordance with screen-operations made by the user, and accesses the advertising agency server 50 connected to the Internet 902 and performs displaying of advertising information and registration of user information. FIG. 3 shows an internal construction of the mobile phone terminal 10 shown in FIG. 2. As shown in this drawing, the mobile phone terminal 10 includes a control circuit 11, a front display 12, a rear display 13, an operation unit 14, a radio circuit 15, a program memory 16 in which various programs including an advertising display program downloaded from the advertising agency server 50 are stored, and an advertising information memory 17 in which advertising information downloaded from the advertising agency server 50 is stored.

The control circuit 11 exerts control through execution of programs by a not-shown processor.

The front display 12 displays letters, images, and the like under the control by the control circuit 11.

The rear display 13 displays the advertising information and the like under the control by the control circuit 11.

The operation unit 14 is composed of a ten-key pad, operation keys, and the like with which the user performs input operations.

The radio circuit 15 performs exchange of data with the wireless network 901 under the control by the control circuit 11. Also, the radio circuit 15 performs A/D conversion and demodulation on each signal received from the wireless network 901 and outputs reception information to the control circuit 11. Further, the radio circuit 15 performs modulation and D/A conversion on transmission information outputted from the control circuit 11 and transmits resultant information to the wireless network 901.

The program memory 16 is assigned a certain area of a not-shown nonvolatile memory (flash memory, for instance). In a certain area of the program memory 16, various programs including an advertising display support program, which are necessary for the mobile phone terminal 10 to operate, are stored at the time of shipment from a factory. Also, in addition to the area described above, the program memory 16 has an area in which an advertising display program downloaded by the control circuit 11 is stored. Note that in the above description, the advertising display support program is stored in the program memory 16 at the time of shipment from a factory, although this program may be written into a not-shown recording medium (such as a CD, a FDD, or the like) and may be written into the program memory 16 through the mediation of a recording medium device. Also, the advertising display support program may be downloaded into the program memory 16 through the Internet. As a method of downloading the advertising display support program through the Internet, for instance, it is possible to use a method with which the advertising display support program is stored in the advertising agency server 50 and is downloaded from the advertising agency server 50, a method with which the advertising display support program is downloaded from a server that the communication company manages, or the like.

The advertising information memory 17 is assigned an area of a not-shown nonvolatile memory (flash memory, for instance) and has an area in which advertising information downloaded by the control circuit 11 from the advertising agency server 50 is stored.

Figure 1A:
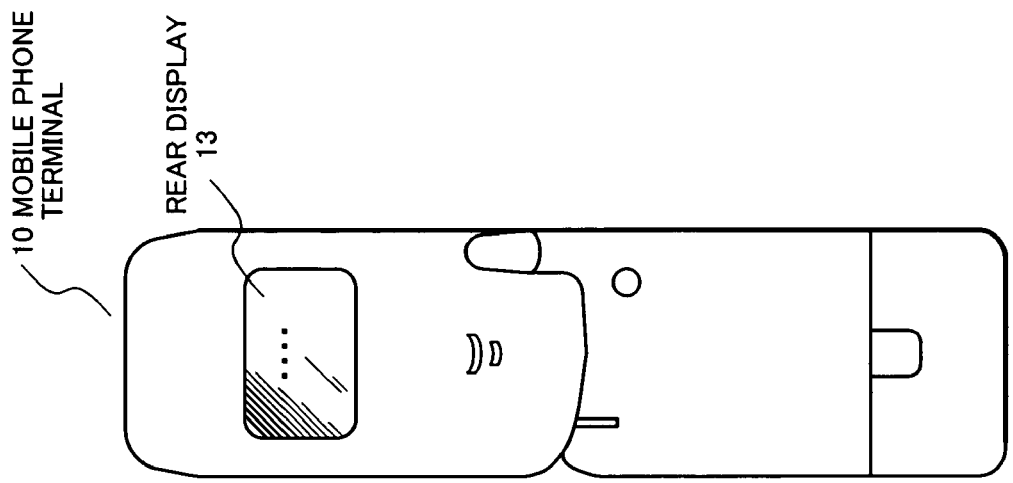
FIGS. 1A to 1C are each a schematic construction diagram showing an example of an external construction of a mobile phone terminal shown in FIG. 2.
Figure 1B:
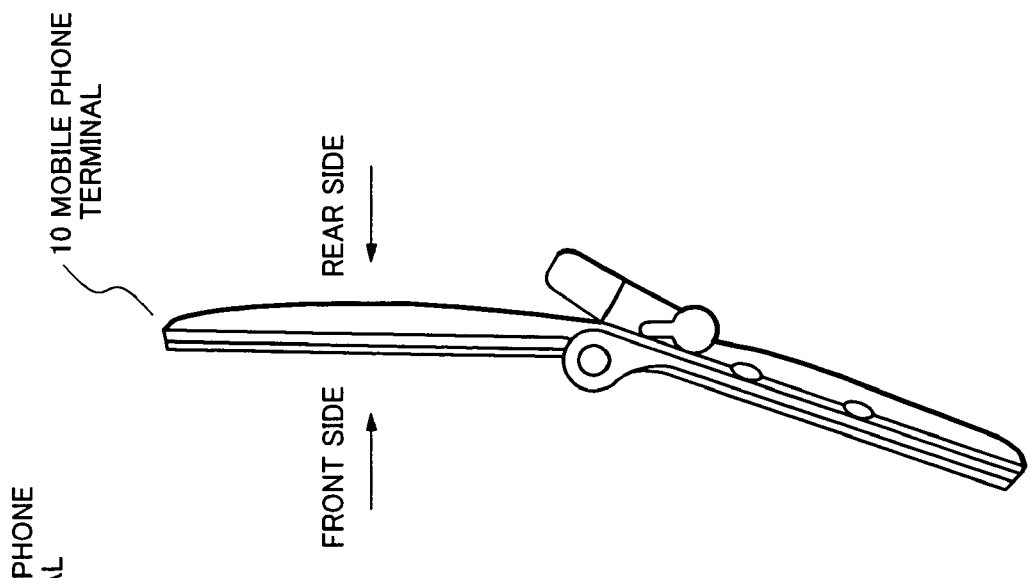
Figure 1C:
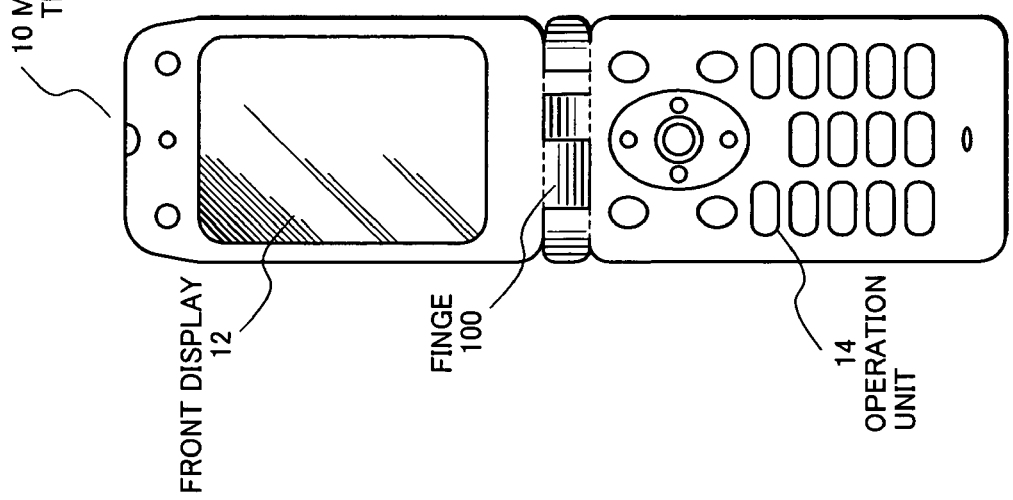

FIGS. 1A to 1C are each a construction diagram showing an external construction of the mobile phone terminal 10. The mobile phone terminal 10 is a foldable type which is foldable by a hinge 100. FIG. 1A shows a state where the mobile phone terminal 10 under an opened state is viewed from a front side. As shown in this drawing, the mobile phone terminal 10 includes the front display 12 and the operation unit 14 on the front side. Here, the opened state means a state where the foldable mobile phone terminal 10 is opened. Also, FIG. 1B shows a state where the mobile phone terminal 10 under the opened state is viewed from a side in order to clarify a distinction between the front side and the rear side of the mobile phone terminal 10. Further, FIG. 1C shows a state where the mobile phone terminal 10 under the opened state is viewed from the rear side. As shown in this drawing, the mobile phone terminal 10 includes the rear display 13 on the rear side.

Next, an operation according to this embodiment of the present invention will be described with reference to the accompanying drawings.

Figure 7:
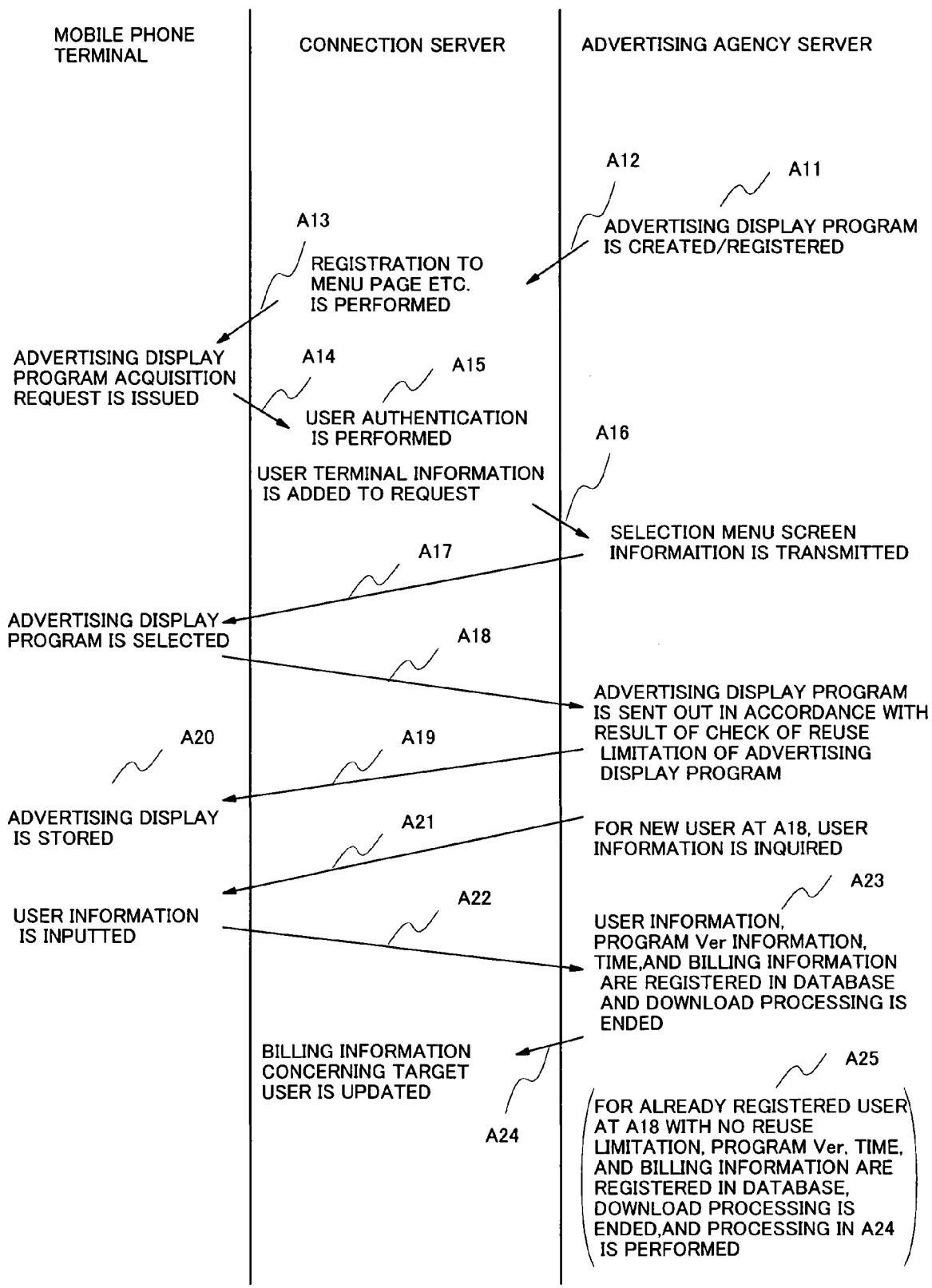
FIG. 7 is a sequence diagram showing a data exchange operation among the mobile phone terminal, a connection server, and an advertising agency server at the time of advertising display program acquisition.
Figure 8:
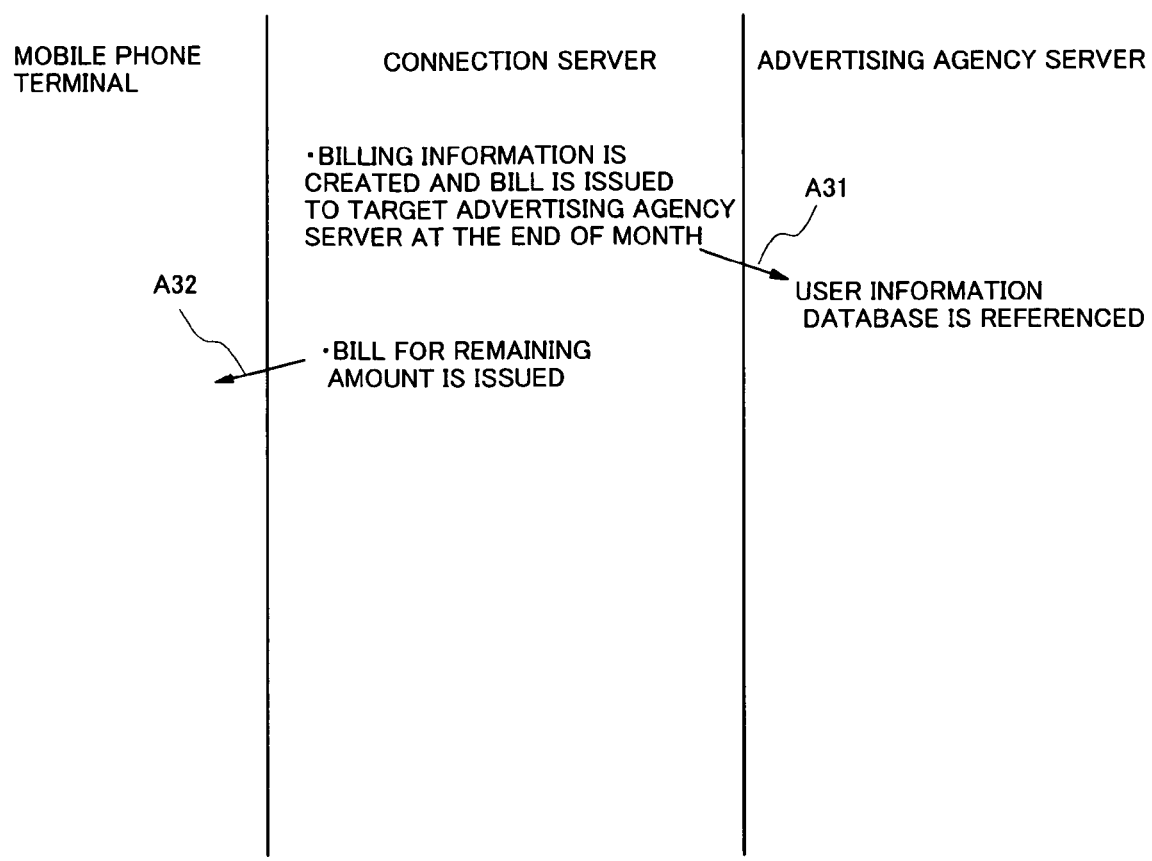
FIG. 8 is a sequence diagram showing a data exchange operation among the mobile phone terminal, the connection server, and the advertising agency server at the time of billing based on billing information.

An overall operation in the present system will be described by referring mainly to FIGS. 7 and 8. First, on the advertising agency side, it is required to apply to the wireless communication company for the right to use the present system and to conclude a contract concerning cost processing. After the contract is concluded, on the advertising agency side, an advertising display program and its advertising information are created and registered together with its program name in the advertising information database 61 through the advertising agency server 50. Then, on the advertising agency side, menu registration into the connection server 30 on the communication company side is performed through the advertising agency server 50. Following this, the connection server 30 adds an item, which is linked to a site providing the registered advertising, to menu screen information stored in a not-shown storage unit (magnetic disk, for instance) (A11 and A12 in the sequence diagram shown in FIG. 7).

Then, the mobile phone terminal 10 is connected to the connection server 30, acquires the menu screen information, and displays a menu screen on the front display 12. When an advertising display program download request is issued by the user through operations of the operation unit 14 of the mobile phone terminal 10 in accordance with the displayed menu screen, the control circuit 11 of the mobile phone terminal 10 sends the request to the connection server 30 through the radio circuit 15 and the wireless network 901 (A13 and A14 in the sequence diagram).

On receiving the download request, the connection server 30 authenticates the possessor (user) of the mobile phone terminal 10 by confirming whether a user ID and a password sent from the mobile phone terminal 10 match any one of pairs of user IDs and passwords registered in the user information database 40. Then, if a result of this confirmation is positive, the connection server 30 acquires terminal information corresponding to the user by searching the user information database 40 based on the terminal identification information received from the mobile phone terminal 10. Following this, the connection server 30 sends out the user ID and the user terminal information to the advertising agency server 50 through the Internet 902 together with the download request (A15 and A16 in the sequence diagram).

On receiving the download request, the advertising agency server 50 judges whether the mobile phone terminal 10 is a terminal equipped with a rear display based on the received terminal information. Then, if a result of this judgment is positive, the advertising agency server 50 reads advertising selection menu screen information, with which an advertising selection menu screen for urging the user to make selection of advertising from among various kinds of advertising is displayed, from a not-shown memory unit (magnetic disk, for instance) and transmits the read information. Note that as a result of the reception of the download request by the advertising agency server 50, a communication path (logical path) is established between the mobile phone terminal 10 having the informed user ID and the advertising agency server 50 (A17 in the sequence diagram).

The control circuit 11 of the mobile phone terminal 10, on receiving the advertising selection menu screen information through the radio circuit 15, displays the advertising selection menu screen on the front display 12. When the user selects his/her desired advertising from the advertising selection menu screen displayed on the front display 12 of the mobile phone terminal 10, the control circuit 11 transmits identification information (program name, for instance) of the selected advertising to the advertising agency server 50 (A18 in the sequence diagram).

The advertising agency server 50 receives the advertising identification information and checks reuse limitation of a corresponding advertising display program. In more detail, the advertising agency server 50 judges whether the user ID, with which the download request was issued, has been registered in the user management database 62 and, if the user ID is not yet registered therein, judges that no reuse limitation is imposed. Also, even if the user ID has been registered, if the requested advertising display program is not yet downloaded, the advertising agency server 50 judges that no reuse limitation is imposed. Further, even if the advertising display program has been downloaded, if a certain time period has passed (if a prescribed time period has passed since its download time registered in the user management database 62), the advertising agency server 50 judges that no reuse limitation is imposed. Still further, even if the advertising display program has been downloaded, if the advertising display program is not yet updated (if the revision registered in the user management database 62 is not yet changed to the latest one), the advertising agency server 50 judges that no reuse limitation is imposed regardless of the prescribed time period.

When judging that no reuse limitation is imposed due to any one of the situations described above, the advertising agency server 50 reads the corresponding advertising display program and advertising information to be displayed by the advertising display program from the advertising information database 61 in accordance with the advertising identification information (program name). Then, the advertising agency server 50 downloads the read advertising display program and advertising information to the mobile phone terminal 10 (A19 in the sequence diagram). Note that as to the check of the revision, the advertising agency server 50 judges whether the revision has been changed to the latest one by comparing the revision corresponding to the program name in the advertising information database 61 with the revision corresponding to the program name and the latest download time in the user management database 62.

The control circuit 11 of the mobile phone terminal 10 stores the advertising display program and its advertising information received via the radio circuit 15 in the program memory 16 and the advertising information memory 17, respectively (A20 in the sequence diagram).

Then, after the transfer of the advertising display program with the advertising information in A19 in the sequence diagram is completed, if the user of the mobile phone terminal 10 is a new user, the advertising agency server 50 transmits user registration screen information to the mobile terminal 10, thereby requesting the user to register his/her user information (A21 in the sequence diagram).

On receiving the user registration screen information through the radio circuit 15, the control circuit 11 of the mobile phone terminal 10 displays a user registration screen on the front display 12. Then, the user inputs his/her user information (telephone number, e-mail address, and the like) by operating the operation unit 14 in accordance with the displayed screen, and the control circuit 11 of the mobile phone terminal 10 transmits the inputted user information to the advertising agency server 50 (A22 in the sequence diagram).

On receiving the user information, the advertising agency server 50 registers the received user information in the user management database 62 together with the program name, revision, download time, usage time, and billing information concerning the downloaded program, and ends the processing for downloading the advertising display program to the mobile phone terminal 10. Note that the billing information in this case includes the number of packets exchanged between the user terminal 10 and the advertising agency server 50 and a cost calculated based on the number of the packets (A23 in the sequence diagram).

When the download processing is ended and the communication path (logical path) between the mobile phone terminal 10 and the advertising agency server 50 is released, the connection server 30 calculates a cost from the number of packets exchanged between the user terminal 10 and the advertising agency server 50. Then, the connection server 30 performs registration into the advertising cost area corresponding to the user ID in the user information database 40 and registers the name of the server used (URL of the advertising agency server 50, for instance) and a usage time in the user information database 40, thereby storing a system usage history (A24 in the sequence diagram)

In A18 in the sequence diagram, the advertising agency server 50 receives the advertising identification information and performs a check of the reuse limitation of the advertising display program. If it is found as a result of this check that the user ID has been registered and the prescribed time period has not yet passed since the download time of the advertising display program, the advertising agency server 50 informs the mobile phone terminal 10 that the requested download is impossible. Following this, the advertising agency server 50 ends the download processing of the advertising display program to the mobile phone terminal 10 and proceeds to processing in A24 in the sequence diagram (A25 in the sequence diagram).

In this manner, the advertising agency server 50 calculates a cost from the number of packets exchanged each time packet exchange is performed between the mobile phone terminal 10 and the advertising agency server 50 and registers the calculated cost in the user management database 62 as the billing information. In a like manner, the connection server 30 calculates a cost from the number of packets exchanged each time packet exchange is performed between the mobile phone terminal 10 and the advertising agency server 50 and registers the calculated cost in the user information database 40 as the billing information. That is, each time the mobile phone terminal 10 and the advertising agency server 50 are connected to each other, the advertising agency server 50 and the connection server 30 each calculate an advertising cost for each user and store the calculated cost in its corresponding database as the system usage history. Then, the wireless communication agent (carrier) issues bills for the cost to the user of the mobile phone terminal 10 and the advertising agency in a manner described below. First, the connection server 30 confirms whether system usage history concerning the user exists in the user information database 40 and, if a result of this confirmation is positive, calculates a usage charge (communication cost) in the current month, which should be paid by the advertising agency, with reference to the system usage history and issues a bill for the calculated usage charge to the advertising agency. Here, in order to issue a bill for a usage charge in one month to the advertising agency, the connection server 30 performs search using the server name and usage times as keys, calculates a total adverting cost for each user, totalizes the calculated total advertising costs, and issues a bill for the totalized costs to the advertising agency (issues billing information to the advertising agency server 50 by e-mail, for instance). On receiving the billing information, the advertising agency server 50 checks the received billing information against the billing information stored in the user management database 62 and, if a result of this check is positive, executes a procedure for payment of the costs (A31 in the sequence diagram shown in FIG. 8).

Following this, the connection server 30 calculates a total usage charge in the current month for each mobile phone user with reference to the user information database 40 and issues, to the user, a bill for a remaining amount obtained by subtracting an advertising cost corresponding to his/her user ID from the total usage charge calculated for the user, thereby giving the user a right to perform a certain amount of free-of-charge communication using the present system (A32 in the sequence diagram).

Here, in A13 and A14 in the sequence diagram described above, the control circuit 11 may execute the advertising display support program in response to selection from among items contained in the menu screen displayed on the mobile phone terminal 10, for instance. In this case, the control circuit 11 issues an advertising display program download request to the connection server 30 and acquires an advertising display program in A17, A18, and A19 through the execution of the advertising display support program.

Figure 9:
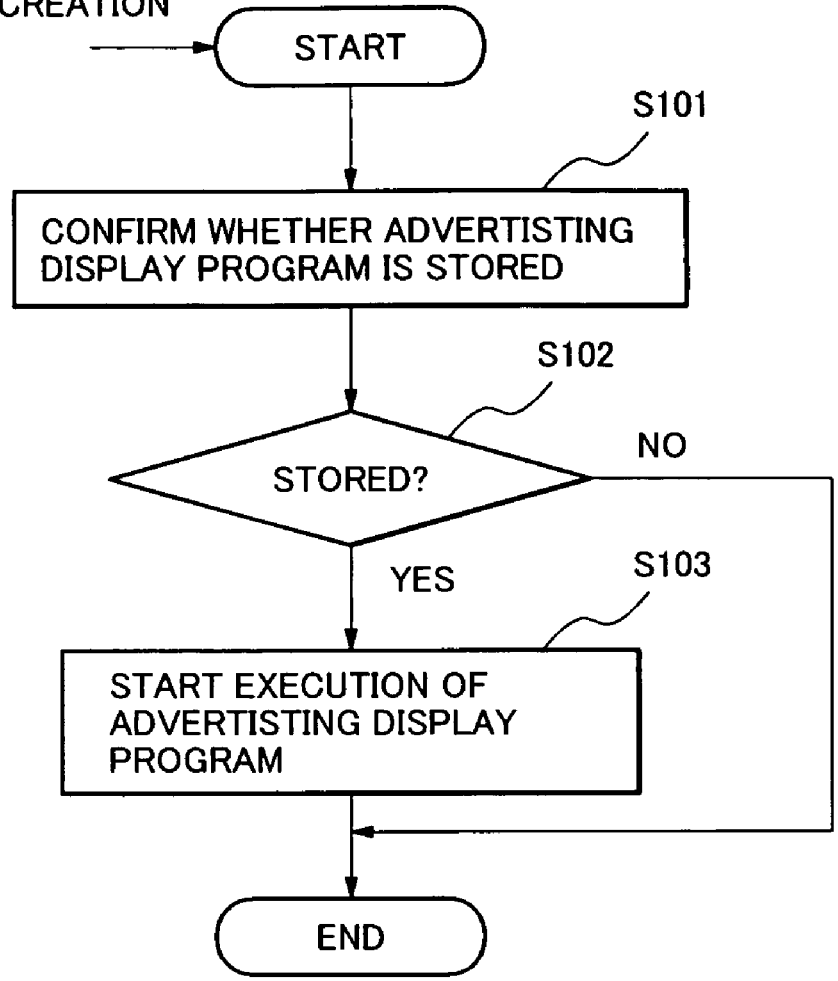
FIG. 9 is a flowchart showing an operation of the mobile phone terminal shown in FIG. 2 at the time of start of voice conversation or mail creation.
Figure 10:
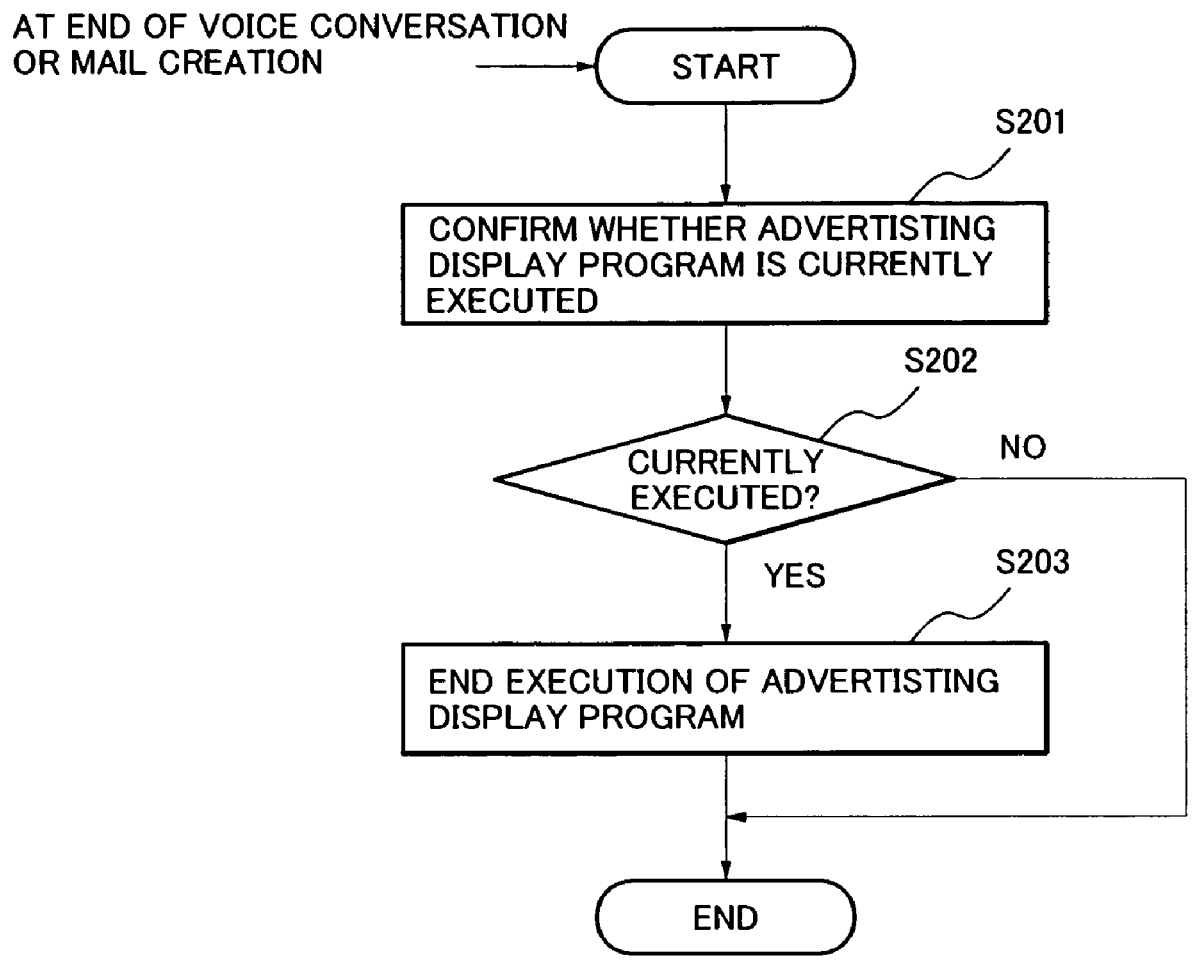
FIG. 10 is a flowchart showing an operation of the mobile phone terminal shown in FIG. 2 at the time of end of voice conversation or mail creation.

Next, an operation of the advertising display program stored-in the mobile phone terminal 10 will be described with reference to FIGS. 9 and 10 showing an operation of the advertising display support program.

At the time of start of voice conversation (at the time of call connection setting with a telephone on the other end) or at the time of start of mail creation (at the time when mail creation is selected from a menu screen and a mail creation screen is displayed on the front display 12), the control circuit 11 of the mobile phone terminal 10 executes the advertising display support program. Through the execution of the advertising display support program, the control circuit 11 confirms whether the advertising display program is stored in the program memory 16 (steps S101 and S102 in FIG. 9).

If it is found in step S102 that the advertising display program is stored in the program memory 16, the control circuit 11 starts execution of the advertising display program stored in the program memory 16 (step S103).

In step S103, if advertising information of the advertising display program designates repetitive displaying of a series of screens, the control circuit 11 executing the advertising display program reads a still image that is a first piece of the advertising information from the advertising information memory 17. Here, in this embodiment, the advertising information includes a certain number of still images (which may contain letter information) and the still images are continuously displayed one by one on the display unit, for instance. The control circuit 11 displays each read still image on the rear display 13, sets an interrupt time in a not-shown internal timer, performs setting in an interrupt factor register in order to indicate that the interrupt is due to advertising display, and activates the internal timer. Then, the control unit 11 sequentially reads the still images from the advertising information memory 17 through timer interrupts using the internal timer and displays the read still images on the rear display 13 in order. With this construction, even if the advertising display program is currently executed, the control circuit 11 is capable of processing each interrupt from the operation unit 14 used at the time of mail creation.

Also, in step S103, if the advertising information designates displaying of a moving image, the control circuit 11 executing the advertising display program reads the moving image that is the advertising information from the advertising information memory 17 and displays the read image on the rear display 13. In this case, even during execution of the advertising display program, the control circuit 11 is capable of performing other operations by processing interrupts due to key operations from the operation unit 14 and other interrupts.

When the voice conversation or the mail creation is ended after awhile, the control circuit 11 of the mobile phone terminal 10 executes the advertising display support program, thereby ending the execution of the advertising display program if the display program is currently executed (steps S201 to S203 in FIG. 10).

Here, as an operation for ending the advertising display program, for instance, in the case of the repetitive displaying of a series of still images described above, the control circuit 11 executing the advertising display support program forcefully clears the interrupt factor in the internal timer used by the advertising display program, thereby prohibiting the execution of the advertising display program. On the other hand, in the case of the moving image described above, the control circuit 11 executing the advertising display support program forcefully ends the display program.

In the above description, the control circuit 11 executes the advertising display program at the time of voice conversation or mail creation, although the control circuit 11 may execute the advertising display program when the mobile phone terminal 10 is in an opened state (state where its foldable enclosure is opened, see FIG. 1). In this case, when the mobile phone terminal 10 is in the opened state, an interrupt occurs in the control circuit 11 and the control circuit 11 performs the same operation as in the flowchart of FIG. 9. On the other hand, when the mobile terminal 10 is in a closed state, an interrupt occurs in the control circuit 11 and the control circuit 11 performs the same operation as in the flowchart of FIG. 10. With this construction, when the mobile phone terminal 10 is brought into the opened state, the control circuit 11 executes the advertising display program and the advertising information is displayed on the rear display 13.

Figure 11:
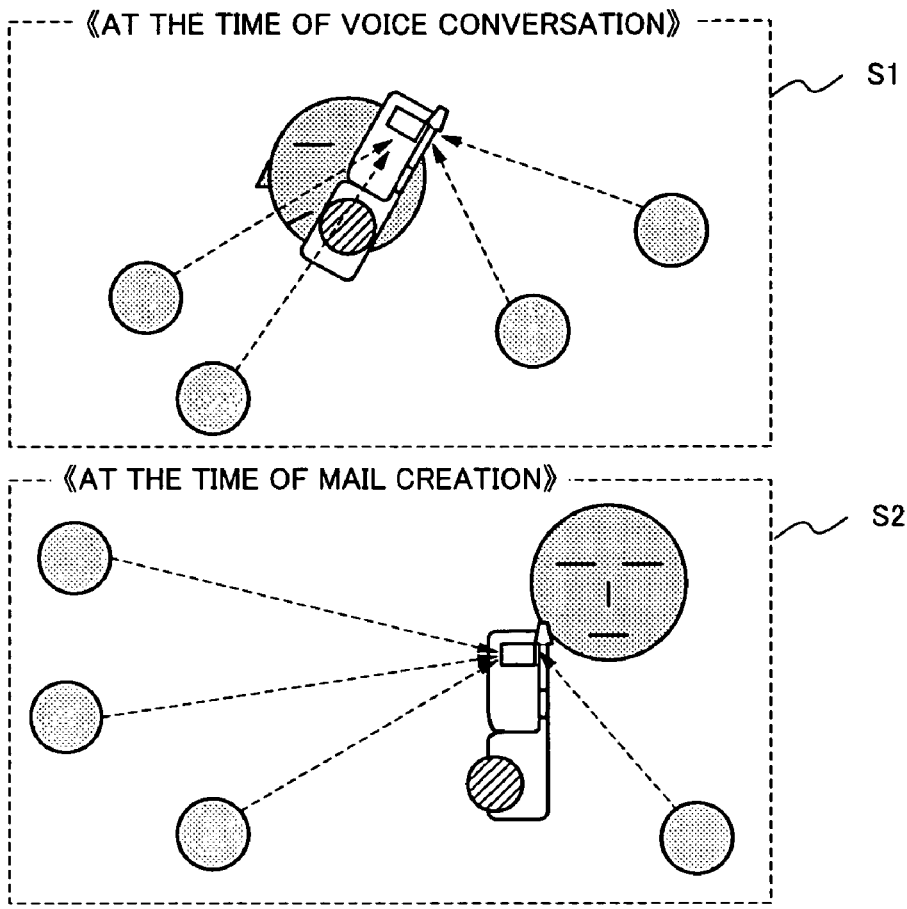
FIG. 11 shows a state where persons around the mobile phone terminal shown in FIG. 2 view advertising displayed on a rear display at the time of usage.

Incidentally, at the time of voice conversation, the mobile phone terminal 10 is held in a manner shown in A1 of FIG. 11, so that the rear display 13 is directed toward the outside. Also, at the time of mail creation that involves operations of the operation unit 14, the mobile phone terminal 10 is held in a manner shown in A2 of FIG. 11 in most cases, so that the rear display is directed toward the outside as in the case of the voice conversation.

Here, in the above description, the advertising agency server 50 has been described as a server that manages a service where advertising information provided from each advertiser is forwarded to the user of each mobile terminal, although the advertising agency server 50 may be a server that the advertiser directly manages or a server that the wireless communication company directly manages.

As described above, according to the embodiment of the present invention, at the time of voice conversation or mail creation with the mobile phone terminal 10, the mobile phone terminal 10 executes the advertising display program and displays advertising on the rear display 13 that is unused in ordinary cases. Therefore, it becomes possible for the advertising agency running the advertising agency server 30 to provide information not only to the user of the mobile phone terminal 10 but also to an indefinite number of persons around the mobile phone terminal 10. As a result, it becomes possible to obtain an extremely high advertising effect.

Also, according to the embodiment of the present invention, the mobile phone terminal 10 displays advertising on the rear display 13 by executing the advertising display program. Therefore, the area of the front display 12 that is necessary at the time of mail creation and the like is not used to display the advertising.

Further, according to the embodiment of the present invention, the mobile phone terminal 10 is constructed so as to execute the advertising display program, so that it becomes possible to establish a new advertising channel at relatively low cost by using an existing infrastructure as a part of this system.

Still Further, according to the embodiment of the present invention, the cost of communication between the mobile phone terminal 10 and the advertising agency server 50 is shouldered by the advertising agency. As a result, it becomes possible for the user of the mobile phone terminal 10 to enjoy a certain amount of free-of-charge communication without impairing the usability of usage.

Also, according to the embodiment of the present invention, when an advertising display program acquisition request is received from the mobile phone terminal 10, the advertising agency server 50 stores information showing a download date and the like in the database together with user information and limits reuse by the same user for a certain time period with reference to the database. With this construction, it becomes possible to prevent fraud through repetitive issuance by the user of the acquisition-request to the advertising agency server 50.

What is claimed is:

1. An electronic advertising system using a mobile terminal, the electronic advertising system comprising:
the mobile terminal having a rear display;
an advertising agency server; and
a connection server that performs relay between the mobile terminal on a wireless communication network side and the advertising agency server on an Internet side,
wherein the advertising agency server includes:
first storage means for storing an advertising display program with advertising information; and
downloading means for downloading the advertising display program with the advertising information in response to an advertising display program acquisition request from the mobile terminal, and
wherein the mobile terminal includes:
a foldable enclosure;
second storage means for storing the advertising display program with the advertising information acquired from the advertising agency server in response to the advertising display program acquisition request;
execution means for executing the advertising display program stored by the second storage means at the time of at least one of the initiation of mail creation or changing the state of the foldable enclosure to an open state; and
display control means for displaying the advertising information on the rear display at the time of mail creation through the execution of the stored advertising display program by the execution means, the advertising information being targeted to a person other than a user of the mobile terminals,
wherein the advertising agency server includes a third storage means for storing, when the advertising display program is downloaded to the mobile terminal, usage history information concerning a user of the mobile terminal, the usage history information including information on a revision of the advertising display program, and
wherein when the advertising display program acquisition request is received from the mobile terminal, if the revision of the advertising display program shown by the usage history information stored in the third storage means is not yet changed to the latest revision, the downloading means downloads the advertising display program with the advertising information.

2. The electronic advertising system using a mobile terminal according to claim 1,
wherein, at the time of voice conversation, the execution means executes the advertising display program.

3. The electronic advertising system using a mobile terminal according to claim 1,
wherein the connection server includes:
first calculation means for calculating a cost from a number of packets exchanged between the mobile terminal and the advertising agency server while a communication path is established therebetween; and
first billing means for issuing a bill for the calculated cost to the advertising agency server.

4. The electronic advertising system using a mobile terminal according to claim 1,
wherein the connection server includes:
first calculation means for calculating a cost from a number of packets exchanged between the mobile terminal and the advertising agency server while a communication path is established therebetween; and
first billing means for issuing a bill for the calculated cost to the advertising agency server, and
wherein the advertising agency server includes:
second calculation means for calculating a cost from the number of packets exchanged between the mobile terminal and the advertising agency server while the communication path is established therebetween; and
payment procedure means for checking the cost shown by the bill from the connection server against the cost calculated by the second calculation means and, if a result of the check is positive, executing a procedure for payment of the cost.

5. The electronic advertising system using a mobile terminal according to claim 1,
wherein the connection server includes:
first calculation means for calculating a cost from a number of packets exchanged between the mobile terminal and the advertising agency server while a communication path is established therebetween; and
second billing means for issuing a bill, to a user of the mobile terminal, for a remaining amount obtained by subtracting the cost calculated by the first calculation means from a communication charge in the current month.

6. The electronic advertising system using a mobile terminal according to claim 1,
wherein when the advertising display program acquisition request is received from the mobile terminal, if a prescribed time period has passed from the download time shown by the usage history information stored by the third storage means, the downloading means downloads the advertising display program with the advertising information.

7. The electronic advertising system using a mobile terminal according to claim 1,
wherein the advertising information comprises information including at least one of one or more still images, a moving image, and letter information.

8. The electronic advertising system using a mobile terminal according to claim 1,
wherein, at the time of changing the state of the foldable enclosure to an open state, the execution means executes the advertising display program.

9. The electronic advertising system using a mobile terminal according to claim 1, wherein
when the advertising display program acquisition request is received from the mobile terminal, the advertising agency server stores information showing a download date and information on the user, and monitors a number of downloading the same advertising display program by the same user of the mobile terminal for a predetermined time period.

10. The electronic advertising system using a mobile terminal according to claim 9, wherein
the advertising agency server restricts the number of downloading the same advertising display program by the same user for the predetermined time period.

11. An electronic advertising display method using a mobile terminal having a rear display, an advertising agency server including a first database for storing an advertising display program with advertising information, and a connection server that performs relay between the mobile terminal on a wireless communication network side and the advertising agency server on an Internet side,
the electronic advertising display method comprising:
causing, when an advertising display program acquisition request is received from the mobile terminal, the advertising agency server to read the advertising display program with the advertising information from the first database and to download the read program to the mobile terminal;
causing the mobile terminal to store, into a memory unit, the advertising display program with the advertising information acquired from the advertising agency server by issuing the advertising display program acquisition request;
causing the mobile terminal to execute the advertising display program stored in the memory unit at the time of at least one of the initiation of mail creation, or changing the state of a foldable enclosure of the mobile terminal to an open state;
causing the mobile terminal to display the advertising information on the rear display at the time of mail creation through the execution of the advertising display program, the advertising information being targeted to a person other than a user of the mobile terminal,
causing, when the advertising display program is downloaded to the mobile terminal, the advertising agency server to store, in a second database, usage history information concerning a user of the mobile terminal, the usage history information including information on a revision of the advertising display program; and
causing, when the advertising display program acquisition request is received from the mobile terminal for downloading the advertising display program with the advertising information, if the revision of the advertising display program shown by the usage history information stored in the second database is not yet changed to the latest revision, the advertising agency server to download the advertising display program with the advertising information.

12. The electronic advertising display method using a mobile terminal according to claim 11, further comprising the mobile terminal to execute the advertising display program at the time of voice conversation.

13. The electronic advertising display method using a mobile terminal according to claim 11, further comprising:
causing the connection server to calculate a cost from a number of packets exchanged between the mobile terminal and the advertising agency server while a communication path is established therebetween, and to issue a bill for the calculated cost to the advertising agency server.

14. The electronic advertising display method using a mobile terminal according to claim 11, further comprising:
causing the connection server to calculate a cost from a number of packets exchanged between the mobile terminal and the advertising agency server while a communication path is established therebetween, and to issue a bill for the calculated cost to the advertising agency server; and
causing the advertising agency server to calculate a cost from the number of packets exchanged between the mobile terminal and the advertising agency server while the communication path is established therebetween, and to check the cost shown by the bill from the connection server against the cost calculated based on the number of packets and, if a result of the check is positive, execute a procedure for payment of the cost.

15. The electronic advertising display method using a mobile terminal according to claim 11, wherein:
the connection server includes a first calculation means for calculating a cost from a number of packets exchanged between the mobile terminal and the advertising agency server while a communication path is established therebetween; and
the connection server is caused to issue a bill, to a user of the mobile terminal, for a remaining amount obtained by subtracting the cost billed by the first billing means from a communication charge in the current month.

16. The electronic advertising display method using a mobile terminal according to claim 11, further comprising:
causing, when the advertising display program is downloaded to the mobile terminal, the advertising agency server to store, in the second database, usage history information concerning a user of the mobile terminal, the usage history information including information on a download time of the advertising display program; and
causing, when the advertising display program acquisition request is received from the mobile terminal for downloading the advertising display program with the advertising information, if a prescribed time period has passed from the download time shown by the usage history information stored by the second database, the advertising agency server to download the advertising display program with the advertising information.

17. The electronic advertising display method according to claim 11,
wherein the advertising information comprises information including at least one of one or more still images, a moving image, and letter information.

18. The electronic advertising system using a mobile terminal according to claim 1,
wherein, at the time of initiation of mail creation, the execution means executes the advertising display program.

19. The electronic advertising display method using a mobile terminal according to claim 11, further comprising the mobile terminal to execute the advertising display program at the time of initiation of mail creation.

20. The electronic advertising display method using a mobile terminal according to claim 11, further comprising the mobile terminal to execute the advertising display program at the time of changing the state of the foldable enclosure to an open state.

21. A non-volatile recording medium encoded with an advertising display support program, the program for use with a system including using a mobile terminal having a rear display, an advertising agency server including a first database for storing an advertising display program with advertising information, and a connection server that performs relay between the mobile terminal on a wireless communication network side and the advertising agency server on an Internet side, the program, when executed, for causing a computer to execute the steps of:
causing, when an advertising display program acquisition request is received from the mobile terminal, the advertising agency server to read the advertising display program with the advertising information from the first database and to download the read program to the mobile terminal;
causing the mobile terminal to store, into a memory unit, the advertising display program with the advertising information acquired from the advertising agency server by issuing the advertising display program acquisition request;
causing the mobile terminal to execute the advertising display program stored in the memory unit at the time of at least one of the initiation of mail creation, or changing the state of a foldable enclosure of the mobile terminal to an open state;
causing the mobile terminal to display the advertising information on the rear display at the time of mail creation through the execution of the advertising display program, the advertising information being targeted to a person other than a user of the mobile terminal,
causing, when the advertising display program is downloaded to the mobile terminal, the advertising agency server to store, in a second database, usage history information concerning a user of the mobile terminal, the usage history information including information on a revision of the advertising display program; and
causing, when the advertising display program acquisition request is received from the mobile terminal for downloading the advertising display program with the advertising information, if the revision of the advertising display program shown by the usage history information stored in the second database is not yet changed to the latest revision, the advertising agency server to download the advertising display program with the advertising information.

22. The computer readable medium encoded with an advertising display support program according to claim 21,
wherein the computer is caused to execute the acquired advertising display program when a foldable enclosure of the computer is changed to an opened state.

23. The computer readable medium encoded with an advertising display support program according to claim 21,
wherein the advertising information comprises information including at least one of one or more still images, a moving image, and letter information.

* * * * *